UNITED STATES PATENT OFFICE.

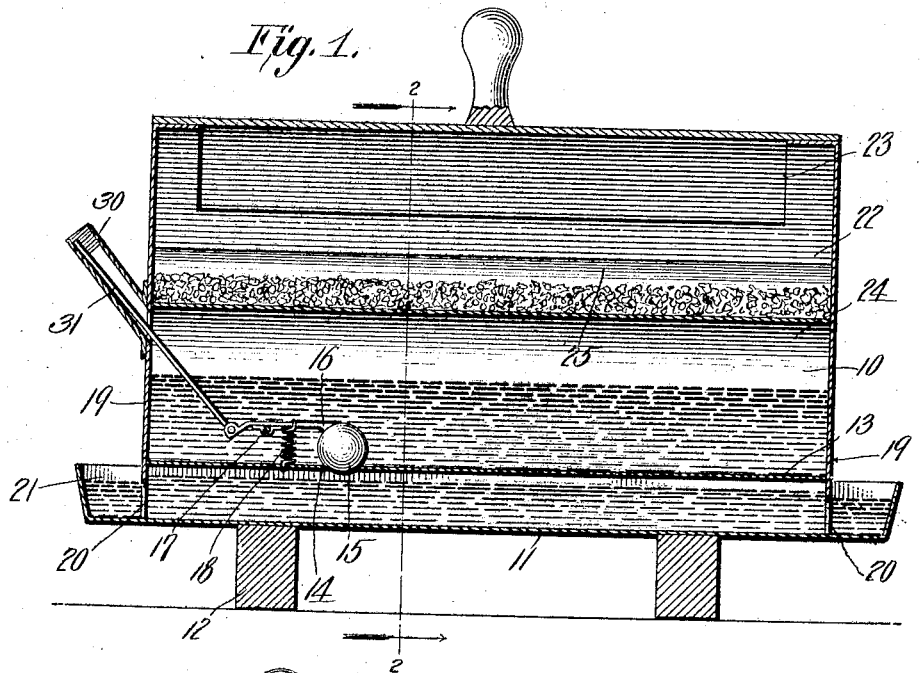
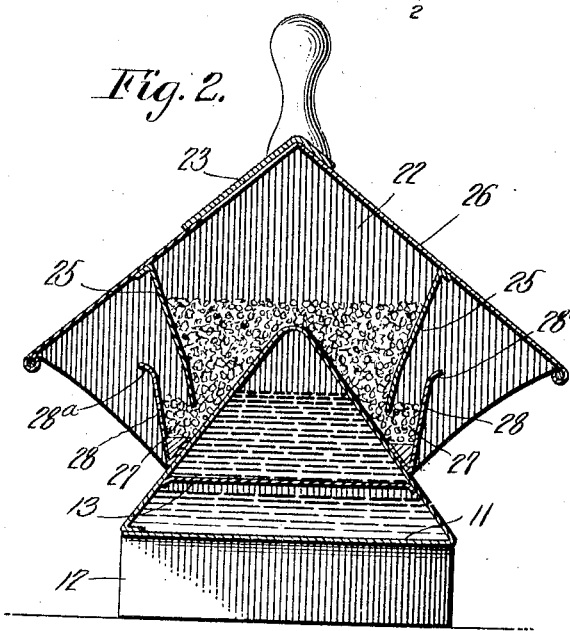
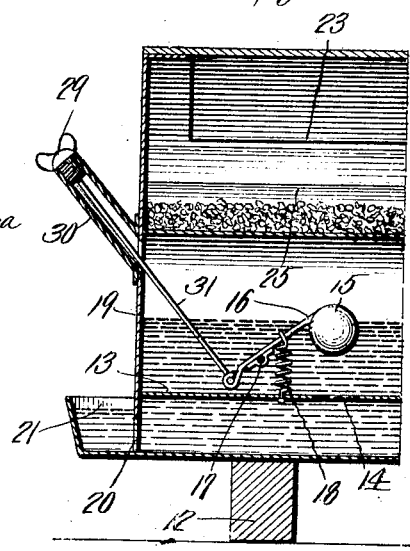

MAX KUETTNER, OF COMFORT, TEXAS.

POULTRY FEEDER AND WATERER.

No. 887,818.  Specification of Letters Patent.  Patented May 19, 1908.

Application filed January 21, 1908. Serial No. 411,938.

*To all whom it may concern:*

Be it known that I, MAX KUETTNER, a subject of the Emperor of Germany, residing at Comfort, in the county of Kendall and State of Texas, have invented certain new and useful Improvements in Poultry Feeders and Waterers, of which the following is a specification.

This invention relates to the care of poultry, and has particular reference to those devices which are intended to supply feed and water to chickens and other species of poultry, the same being supplied to the apparatus in such quantities as will serve the purpose for a considerable length of time and yet provide a means whereby the feed will be preserved in good condition and not be wasted, and the water will be supplied to the poultry only in such quantities as may be desirable.

For a full understanding of the invention, including its construction and advantages, reference is to be had to the following detail description and accompanying drawings, in which, Figure 1 is a vertical, central, longitudinal section of the apparatus, showing the valve in the position which it occupies during the operation of filling the water tank; Fig. 2 is a vertical transverse section on the line 2—2 of Fig. 1, and Fig. 3 is a fragmentary view similar to that of Fig. 1, showing the filling spout closed and with the valve in its normal position.

Similar parts are referred to and indicated on the several views of the drawings by like reference characters.

This invention comprises in the preferred embodiment thereof a water tank 10 of any suitable size and dimensions, the top of which is preferably of an inverted V-shape as indicated in Fig. 2. The bottom 11 of the water tank constitutes the bottom of the entire structure, and may rest upon the ground directly if small chickens are to be supplied with feed or water, or it may be supported upon blocks 12 if desired. Within the tank 10 and extending substantially parallel to the bottom 11 is a false bottom 13 having a hole 14, adapted to be closed at times by a suitable valve such as the ball valve 15 carried by an arm 16 pivoted to a fixed pivot 17 and adapted to be held in closed position by a spring 18. Each end 19 of the structure has an opening 20 adjacent to the bottom 11 through which the water may flow outward into the extension or trough 21 through whose open top the poultry may drink.

In the upper portion of the apparatus there is provided a feed bin or compartment 22 into which the feed may be introduced through any suitable opening in the roof closed by a cover 23, or the like. Said grain or feed compartment 22 is bounded at its ends by the end pieces 19 aforesaid, on its bottom by the inverted V-shaped roof 24 of the water tank, on the sides by wings or guards 25, and on top by the roof 26 of the apparatus and the rainproof cover 23. Each of the wings or guards 25 extends throughout the length of the apparatus and extends from the roof downward and at its lower edge is spaced sufficiently far from the roof of the water tank to allow the feed to roll outward from the feed receptacle into a trough 27 formed by the said wing on one side and a flange 28 on the outside, and from which trough thus formed the poultry may pick the feed. As will be noted each of the flanges 28 is secured in any suitable manner to the inclined top 24 of the water tank, and the upper edge of the flange is preferably outwardly curved or rounded at 28ª to prevent injury to the fowls while feeding.

The roof 26 on each side extends sufficiently far down toward the ground and the ends 19 of the apparatus are sufficiently wide to thoroughly protect the feed in the troughs 27 from the elements, thus preventing waste of the feed.

During the operation of the watering apparatus the parts are positioned as indicated in Fig. 3, the valve 15 being spaced from the hole 14 in the false bottom 13, and in which position water may flow freely from the water tank into the bottom of the structure and outward into the extension 21 in which it will rise to the height of the top of the opening 20, the bulk of the water being retained in the tank by the pressure of the atmosphere in a well known manner. In order to replenish the supply of water in the water tank the screw plug 29 is removed from the spout 30 allowing the rod 31 to move upwardly and outwardly while the valve 15 is moved downwardly by the spring 18, the rod 31 being pivoted to the arm 16 on the end of the same opposite to the valve 15. After filling the tank the screw plug 29 is replaced in the spout and the plug on entering the spout contacts the rod 31, moving the same downwardly to open the valve, as plainly shown in Fig. 3. The plug 29 constitutes an air tight closure for the tank.

Having thus described the invention, what is claimed as new is,

1. In a device of the class described, the combination of a water tank having an inclined roof and a perforated false bottom, a receptacle for grain above said tank and whose bottom is said inclined roof, a flange secured to said roof and forming a trough for the grain, the receptacle also comprising a wing forming a side thereof and adapted to support the bulk of the grain contained therein and a roof, the latter roof being extended to cover said trough, an open topped extension at the bottom of the water tank, and means coöperating with the said perforation in the said false bottom to open and close the same.

2. In a device of the character set forth, the combination of a water tank, having a roof in the form of an inverted V, the water being accessible at the lower portion of the tank, means whereby the water tank may be filled, a grain receptacle whose bottom is the said roof, a trough on each side of said roof, portions of the grain receptacle constituting means for supporting the body of the feed therein and directing it into the said troughs and another portion constituting rain proof covering means for the grain receptacle and said troughs, substantially as set forth.

3. In a device substantially as set forth, the combination of a water tank provided with a false bottom having a hole therethrough, a filling spout for the said tank, an arm pivoted within the tank, a valve at one end of said arm adapted to close said hole, a spring to move said arm on its pivot in one direction, a rod connected to the other end of said arm and extending into the said filling spout, and a closure for the said spout engaging with the outer end of said rod to force the rod downwardly to move said arm in the opposite direction.

4. In a device of the character set forth, the combination with a water tank provided with a false bottom having a hole therethrough, a spout extending outwardly and upwardly from one end of the tank, an arm pivoted within the tank, a valve carried by one end of the arm and adapted to close said hole in the false bottom, a spring adapted to effect such closure, a rod pivoted to the opposite end of said arm and extending within the said spout, and a screw plug to close the outer end of the spout and engage with said rod to cause the valve to open against the tension of the spring.

In testimony whereof I affix my signature in presence of two witnesses.

MAX KUETTNER

Witnesses:
F. MUERDTER,
W. S. C. SAUL.